(12) United States Patent
Mogard

(10) Patent No.: US 6,253,994 B1
(45) Date of Patent: *Jul. 3, 2001

(54) PROCESS AND APPARATUS FOR APPLYING A CLOSURE TO A PACKAGING MATERIAL

(75) Inventor: Jens Mogard, Buffalo Grove, IL (US)

(73) Assignee: Tetra Laval Holdings and Finance SA, Pully (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,145

(22) Filed: May 4, 1998

(51) Int. Cl.⁷ .............................. B65D 43/00; B65D 25/04
(52) U.S. Cl. .................. 229/125.14; 229/209; 229/246; 229/125.42; 229/125.04; 229/125.15
(58) Field of Search ...................... 229/209, 246, 229/125.42, 29.17, 125.04, 125.14, 125.15

(56) References Cited

U.S. PATENT DOCUMENTS

| | | | |
|---|---|---|---|
| 1,103,177 | * | 7/1914 | Dye ........................................ 229/246 |
| 2,151,202 | * | 3/1939 | Guyer ..................................... 229/246 |
| 2,575,544 | | 11/1951 | Zinn, Jr. . |
| 3,549,079 | * | 12/1970 | Northrup .............................. 229/215 |
| 3,568,910 | * | 3/1971 | McConnell ....................... 229/125.42 |
| 3,618,847 | * | 11/1971 | Koolnis ................................ 229/212 |
| 4,005,815 | * | 2/1977 | Nerenberg et al. .............. 229/142 X |
| 4,015,768 | * | 4/1977 | McLennan ........................... 229/234 |
| 4,456,164 | * | 6/1984 | Foster et al. ..................... 229/125.35 |
| 4,548,593 | | 10/1985 | Tisma . |
| 4,581,873 | | 4/1986 | Knuppertz et al. . |
| 4,599,123 | | 7/1986 | Christensson . |
| 4,744,467 | | 5/1988 | Jonsson et al. . |
| 4,775,096 | | 10/1988 | Andersson et al. . |
| 4,801,078 | | 1/1989 | Carlsson . |
| 4,819,865 | | 4/1989 | Lisiecki . |
| 4,860,902 | | 8/1989 | Kieser . |
| 4,872,562 | * | 10/1989 | Wyberg ........................ 229/125.17 X |
| 4,872,935 | | 10/1989 | Newkirk et al. . |
| 4,964,562 | * | 10/1990 | Gordon ............................ 229/125.15 |
| 5,076,493 | * | 12/1991 | Anderson ........................ 229/125.15 |
| 5,110,041 | * | 5/1992 | Keeler ............................. 229/125.15 |
| 5,125,569 | * | 6/1992 | Anderson et al. .......... 229/125.42 X |
| 5,242,701 | | 9/1993 | Poole . |
| 5,421,512 | | 6/1995 | Poole . |
| 5,601,669 | | 2/1997 | Moody et al. . |
| 5,816,487 | * | 10/1998 | Skinner ................................ 229/248 |

* cited by examiner

Primary Examiner—Allan N. Shoap
Assistant Examiner—Tri M. Mai
(74) Attorney, Agent, or Firm—Welsh & Katz

(57) ABSTRACT

One aspect of the present invention is a packaging material having a abhesive for preventing the adherence of the interior surfaces of the packaging material during application of a closure thereto. One example is a carton blank having the closure attached prior to erection of the blank on a packaging machine. Another example is a, roll of packaging material such as used to fabricate a TETRA BRIK® parallelepiped package on a vertical form, fill and seal machine. Another aspect of the invention is a method for applying a closure to such a packaging material. Yet another aspect of the present invention is an apparatus for applying closures to such packaging material. The abhesive may be a coating, printing, strip or an embossment of the material.

12 Claims, 14 Drawing Sheets

PROCESS AND APPARATUS FOR APPLYING A CLOSURE TO A PACKAGING MATERIAL

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to closure applicators. Specifically, the present invention relates to closure applicators for container blanks.

2. Description of the Related Art

Containers such as gable top cartons and the ubiquitous TETRA BRIK® parallelepiped package, have always been popular as containers for liquid foods such as milk, orange juice and the like. Recently, the use of closures, or fitments, to access the contents have become very appealing to consumers due the resealability and tamper-proof features.

Numerous applicators have been invented that apply a closure/fitment to an erected carton or a completely formed, filled, and sealed carton. For example, a very efficient process for applying a fitment through a pre-cut hole in an erected carton is described in U.S. pat. No. 5,819,504. Another efficient process is described in U.S. pat. No. 5,829,228 which hot melts a fitment to an erected carton. Other applicators apply the fitment to a filled and sealed carton through use of hot melt. Although the packaging industry has created numerous applicators for applying a fitment to an erected carton or sealed carton, the industry has failed to provide a process or apparatus for applying a closure/fitment to an unerected carton blank.

Other problems arise with providing a closure on a TETRA BRIK® package since the formation of the package is on a vertical form, fill and seal machine from a roll of packaging material which is sealed longitudinally to form a tube and traversely cut to produce an individual package which is folded into the parallelepiped shaped. The roll of packaging material is immersed in a hydrogen peroxide bath and conveyed through a series of winding rollers on the machine.

The main reason for the failure is that these containers are coated with a polymer material such as polyethylene. The interior and exterior surface of the container are coated thereby creating a potential for adhesion between overlying surfaces if heat (as used in hot melt application) or pressure (ultrasonic welding) is used to attach a closure to an unerected carton blank or a tube of packaging material.

The failure to resolve this problem restricts application of closures/fitments to the form, fill and seal machine through either integrated machinery or machine in-line with the packaging machine. Also, the use of integrated machinery causes problems with maintaining a sterile environment for aseptic packaging.

BRIEF SUMMARY OF THE INVENTION

The present invention provides a means of applying a closure to packaging material while avoiding the problem of sealing the material to itself. The present invention is able to accomplish this by providing abhesion means placed on the interior of the packaging material about the area of the closure. The abhesion means blocks the chemical adhesion between one surface and the other. The abhesion means may be a coating, a printing, or physical modifications of the surface of the interior of the carton blank.

One aspect of the present invention is a packaging material having an abhesion means placed on the interior of the surface of the matrial. The placement of the abhesion means corresponds to the placement of the closure. A preferred placement is on the interior surface of the panel lying under the panel on which the closure will be attached by sealing or heat.

Another aspect of the present invention is a method for attaching a closure to a packaging material having the abhesion means thereon. Yet another aspect of the present invention is a carton blank produced in accordance with the method. Still another aspect of the present invention is an apparatus for applying a closure to a packaging material with the abhesion means thereon.

It is a primary object of the present invention to provide a method and apparatus for attaching a closure to a packaging material.

It is an additional object of the present invention to provide an unerected carton blank having a closure thereon.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

Several features of the present invention are further described in connection with the accompanying drawings in which:

There is illustrated in FIG. 1 a top plan view of a preferred embodiment of the interior surface a carton blank of the present invention;

Figure 2:
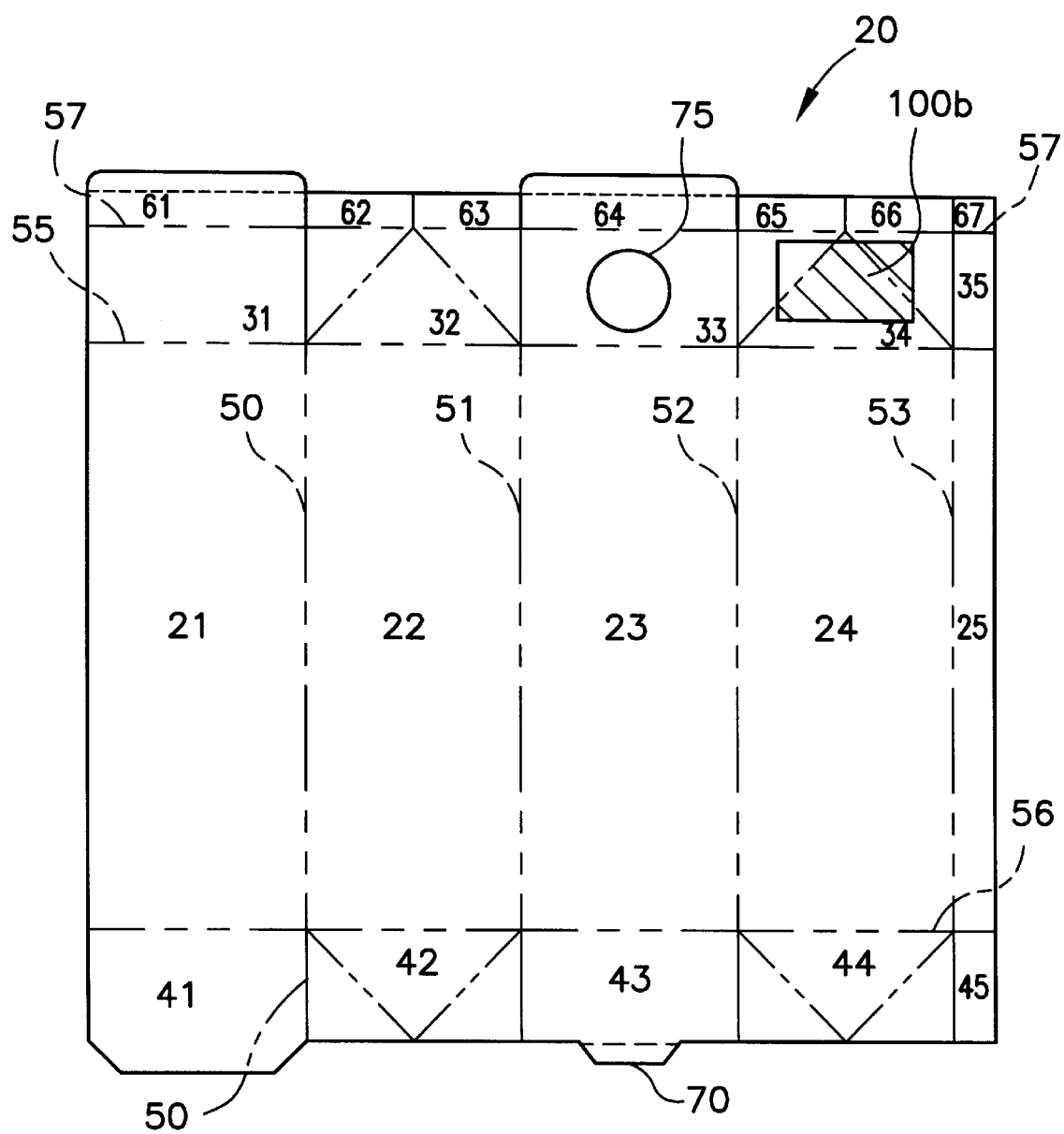
Figure 3:
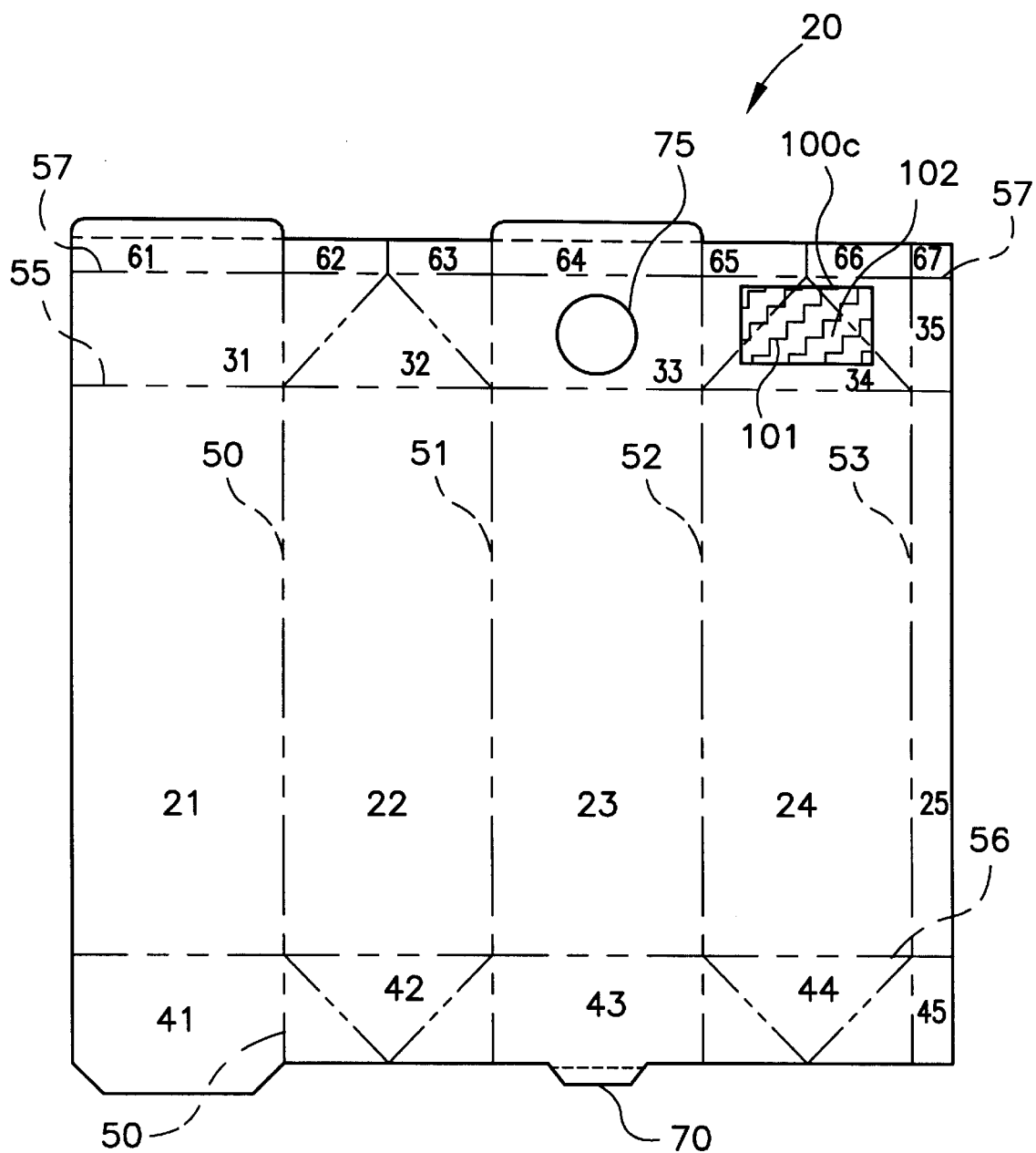
Figure 4:
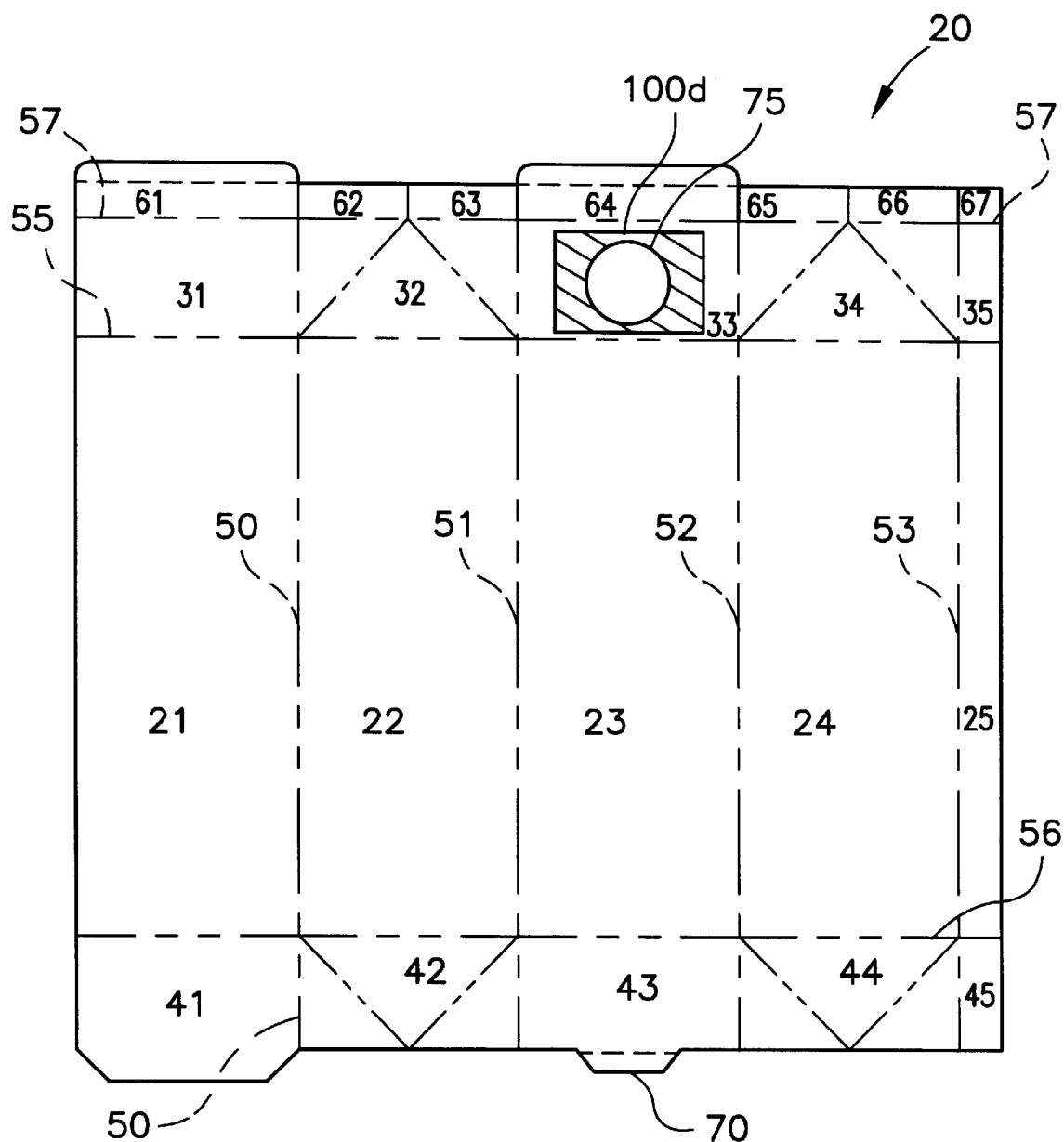
Figure 5:
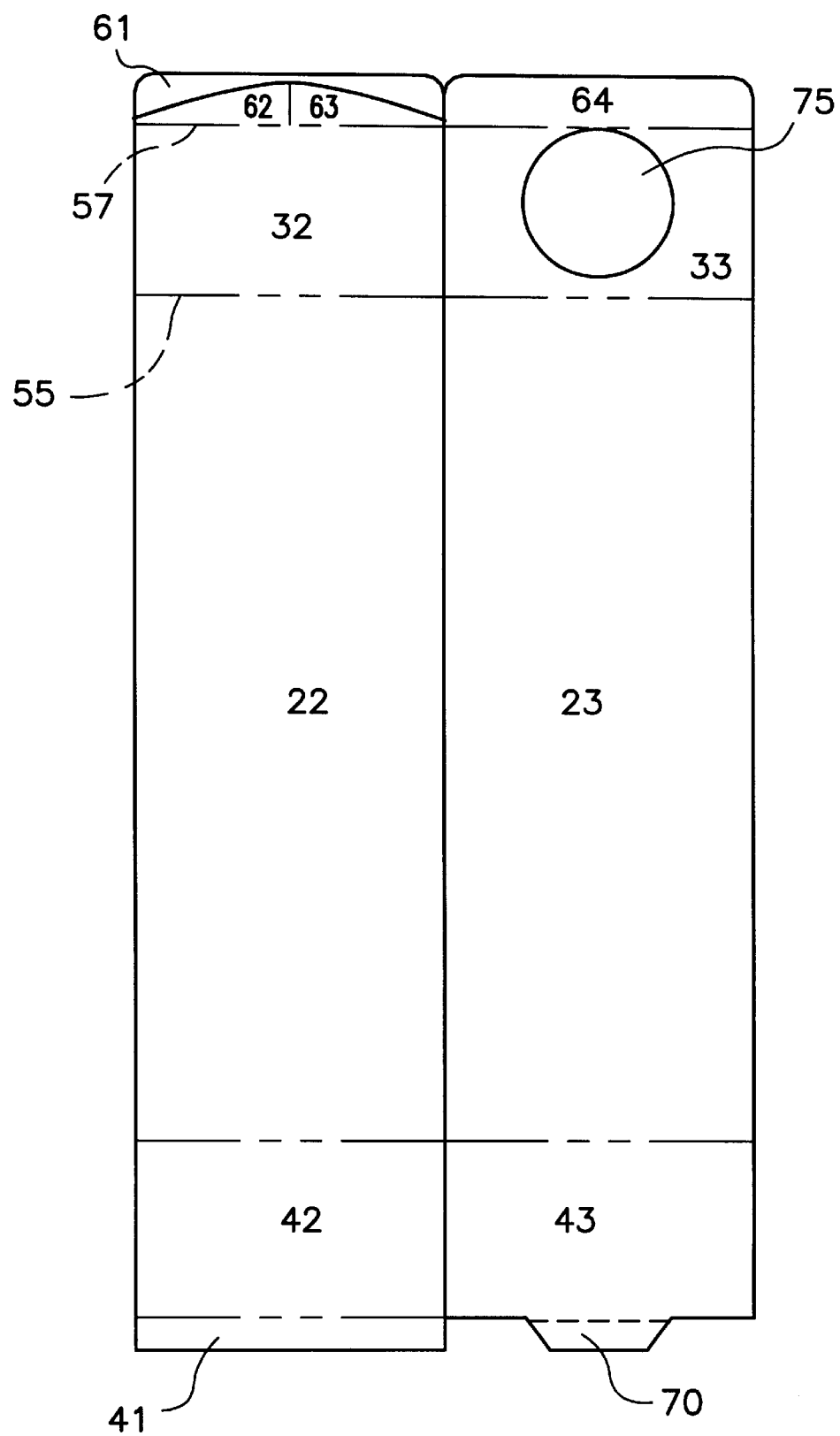
Figure 5A:
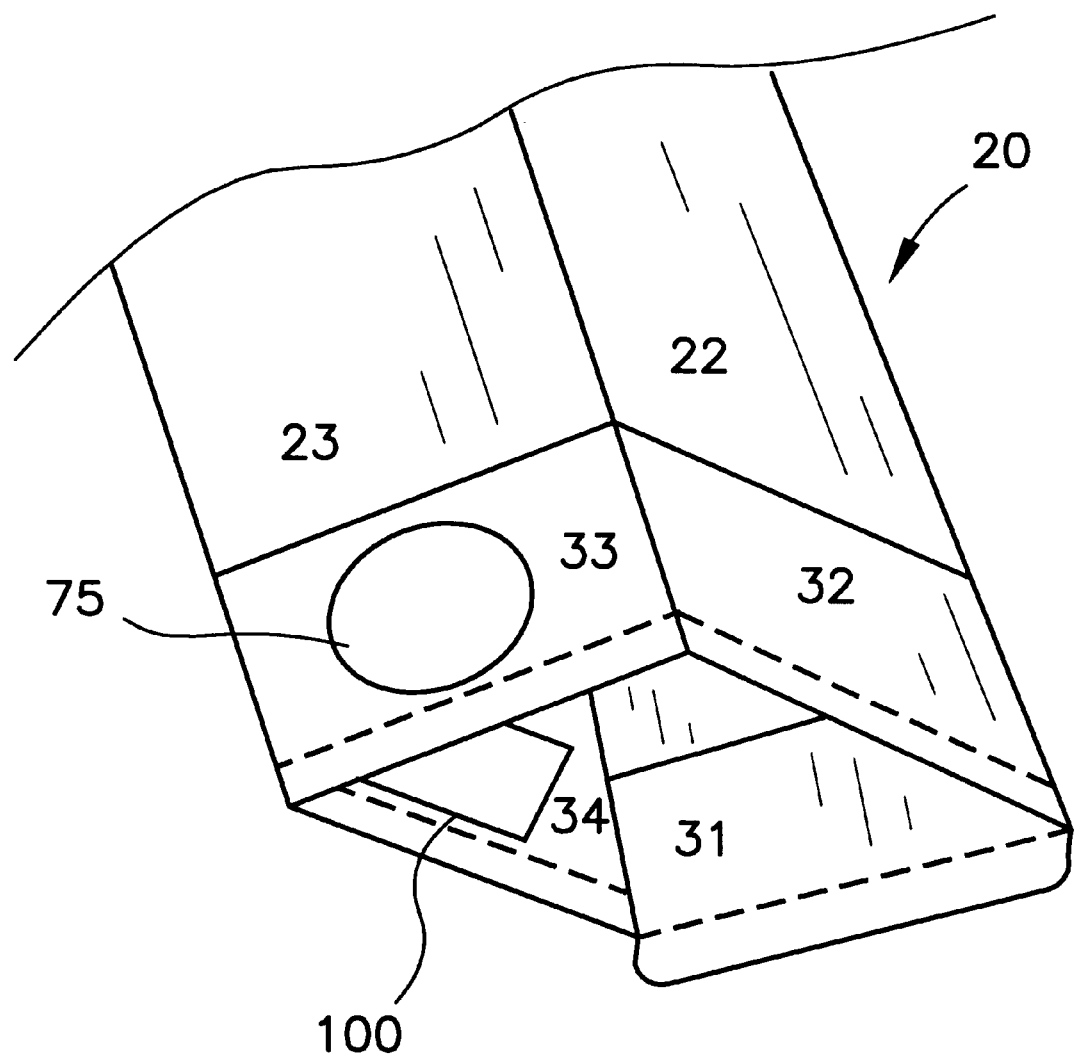
Figure 6:
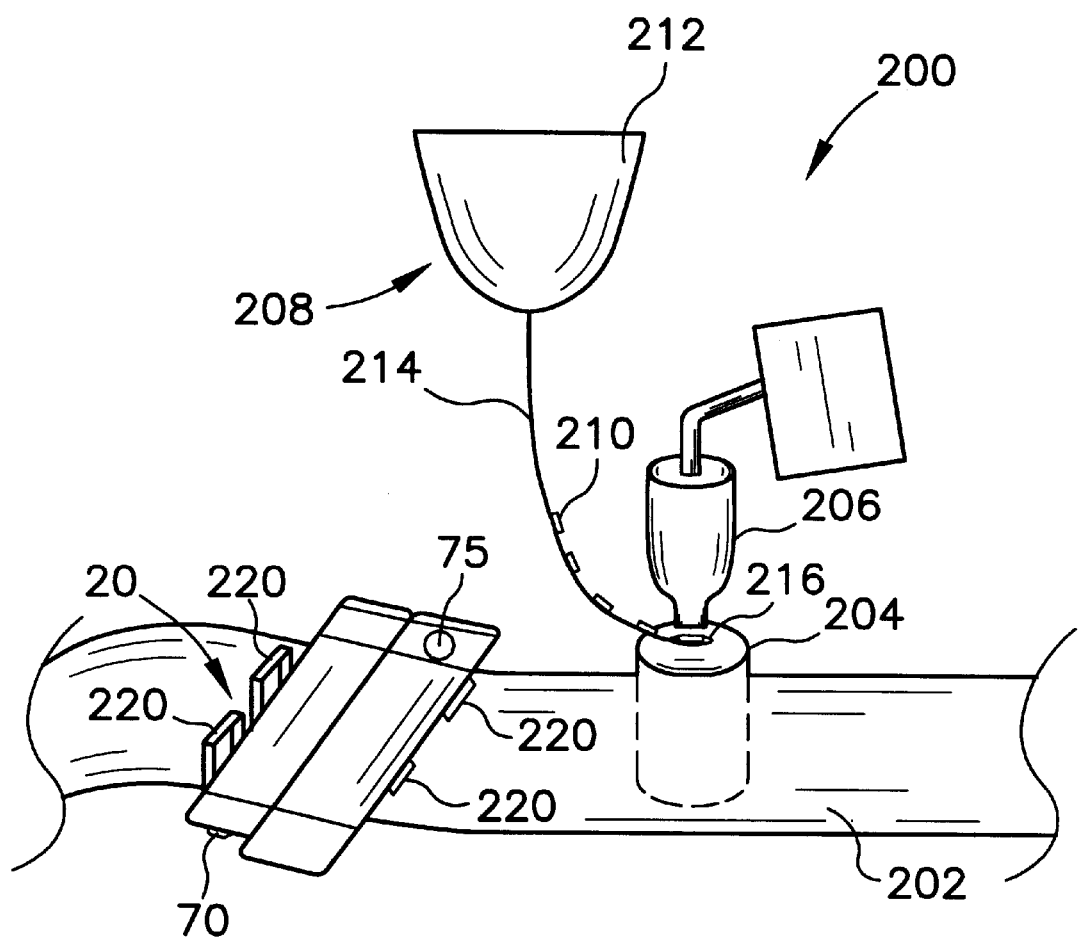
Figure 7:
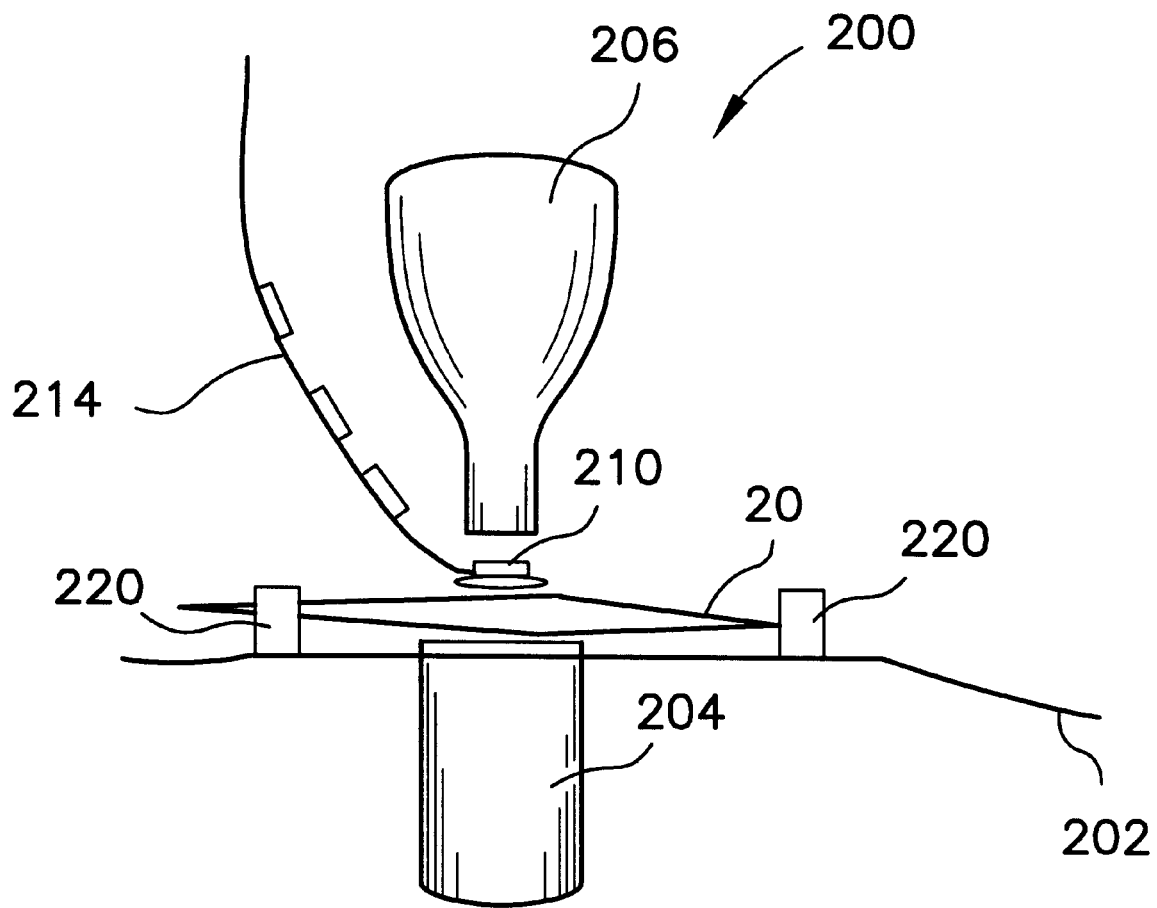
Figure 8:
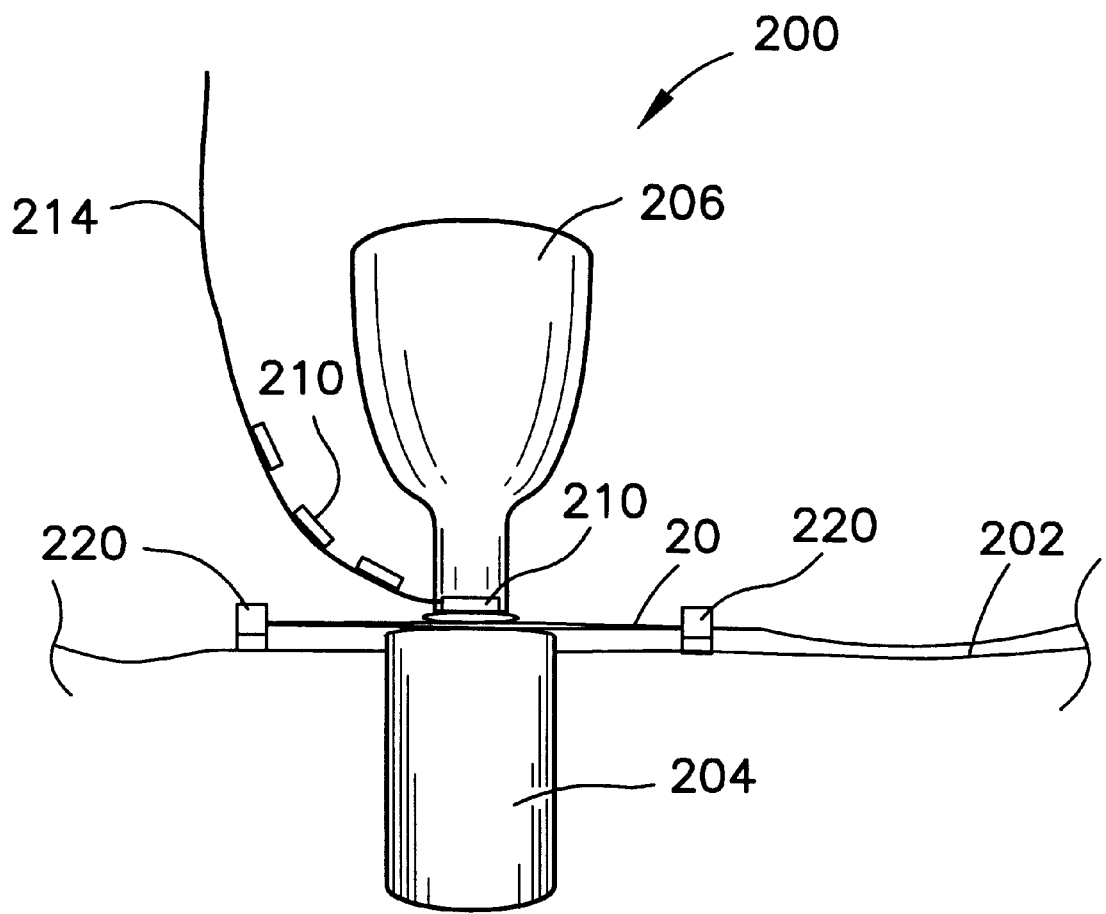
Figure 9:
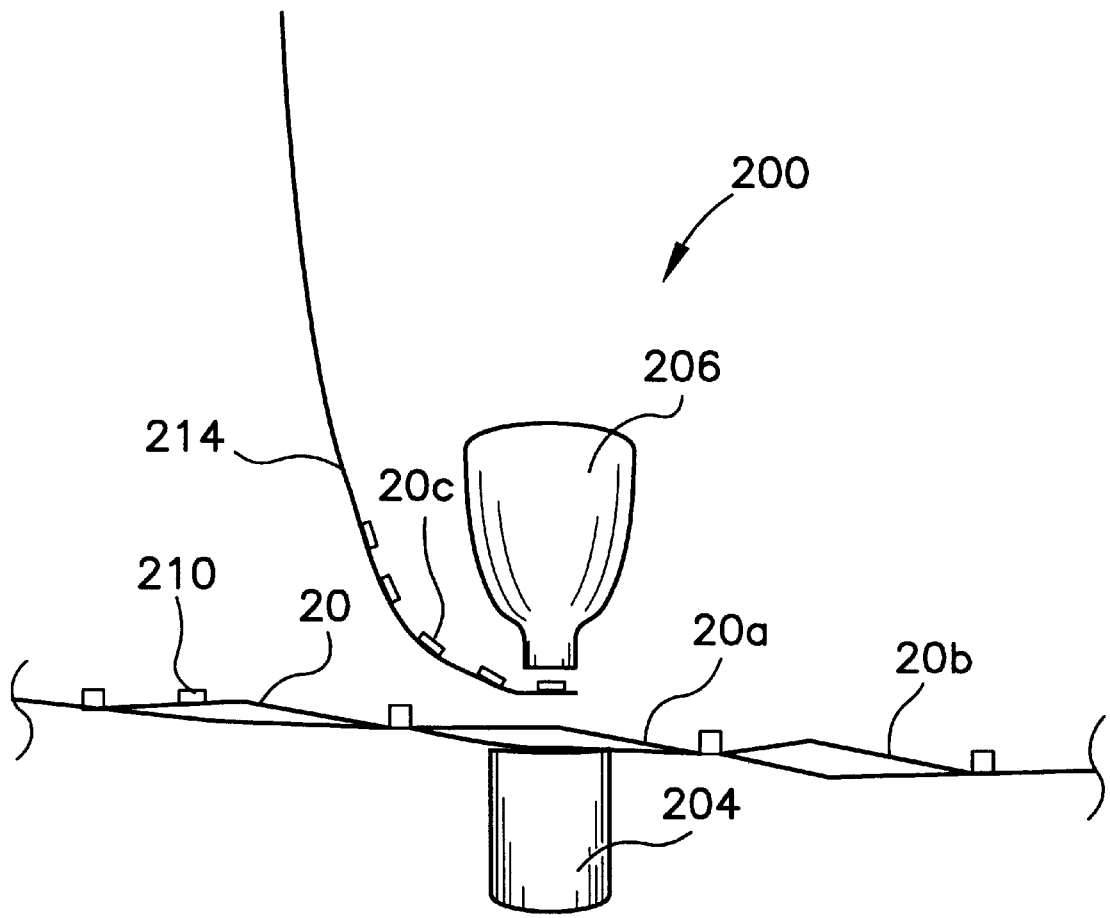
Figure 10:
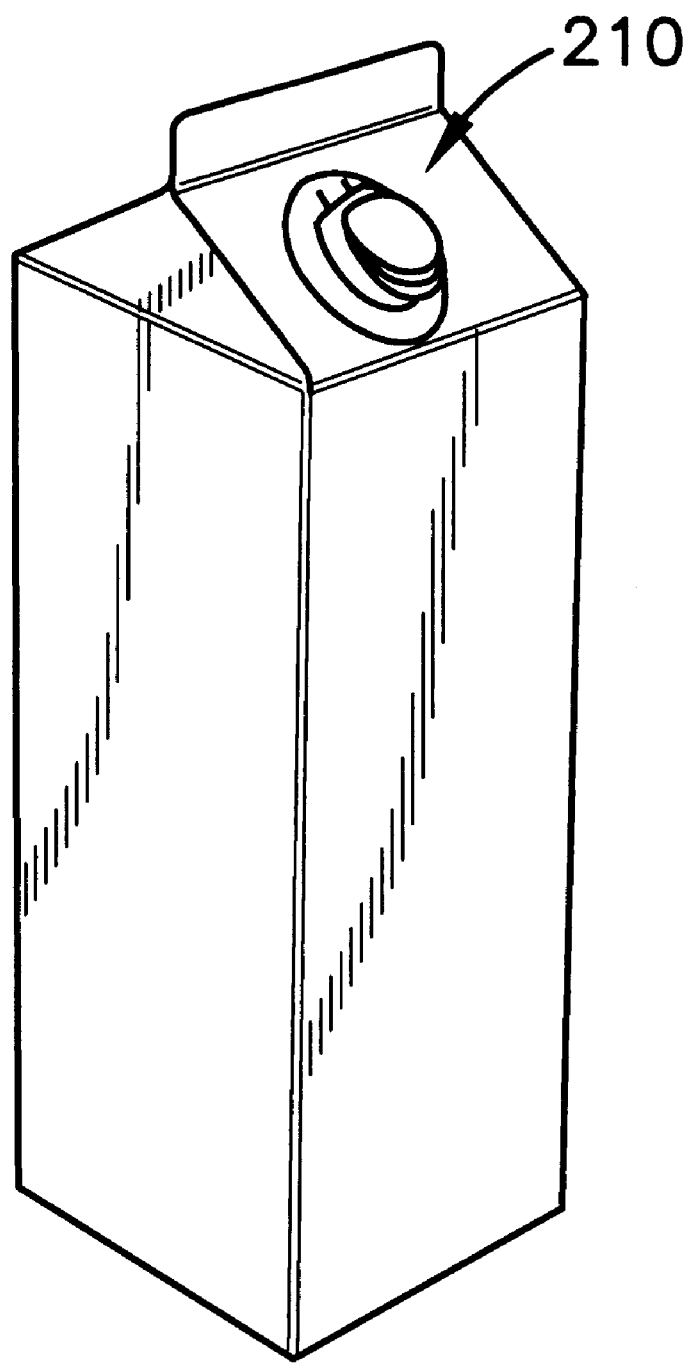

There is illustrated in FIG. 2 a top plan view of an alternative embodiment of the interior surface of a carton blank of the present invention;

There is illustrated in FIG. 3 top plan view of an alternative embodiment of the interior surface of a carton blank of the present invention;

There is illustrated in FIG. 4 top plan view of an alternative embodiment of the interior surface of a carton blank of the present invention;

There is illustrated in FIG. 5 a top plan view of a folded and longitudinally sealed carton blank of the present invention;

There is illustrated in FIG. 5A the carton blank of FIG. 5 in a "diamond" position to illustrate the interior and exterior surfaces;

There is illustrated in FIG. 6 an apparatus of the present invention;

There is illustrated in FIG. 7 the apparatus at a first step of the application procedure;

There is illustrated in FIG. 8 the apparatus at a second step of the application procedure;

There is illustrated in FIG. 9 the apparatus at a third step of the application procedure;

There is illustrated in FIG. 10 an erected and sealed carton.

Figure 11:
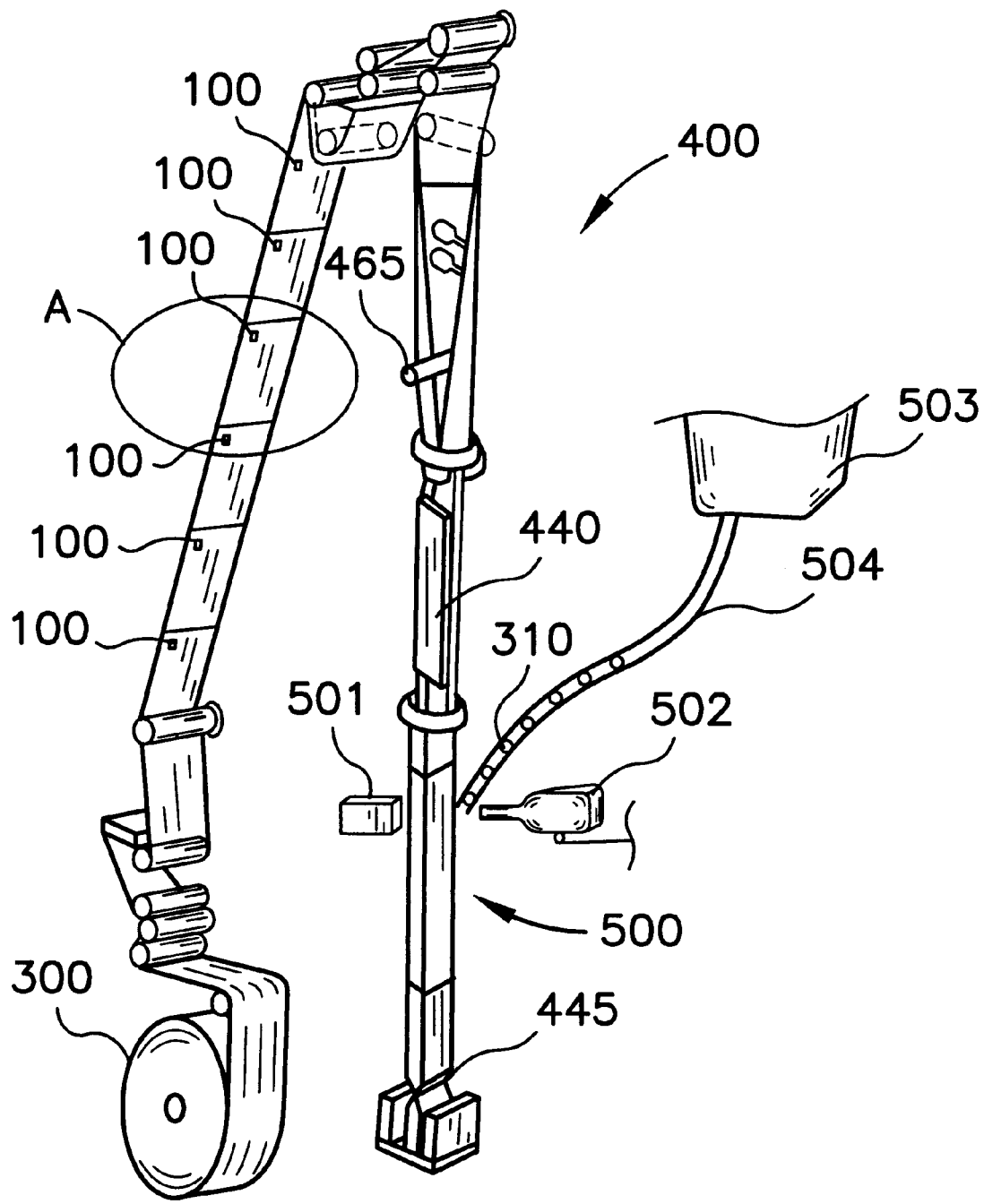
Figure 11A:
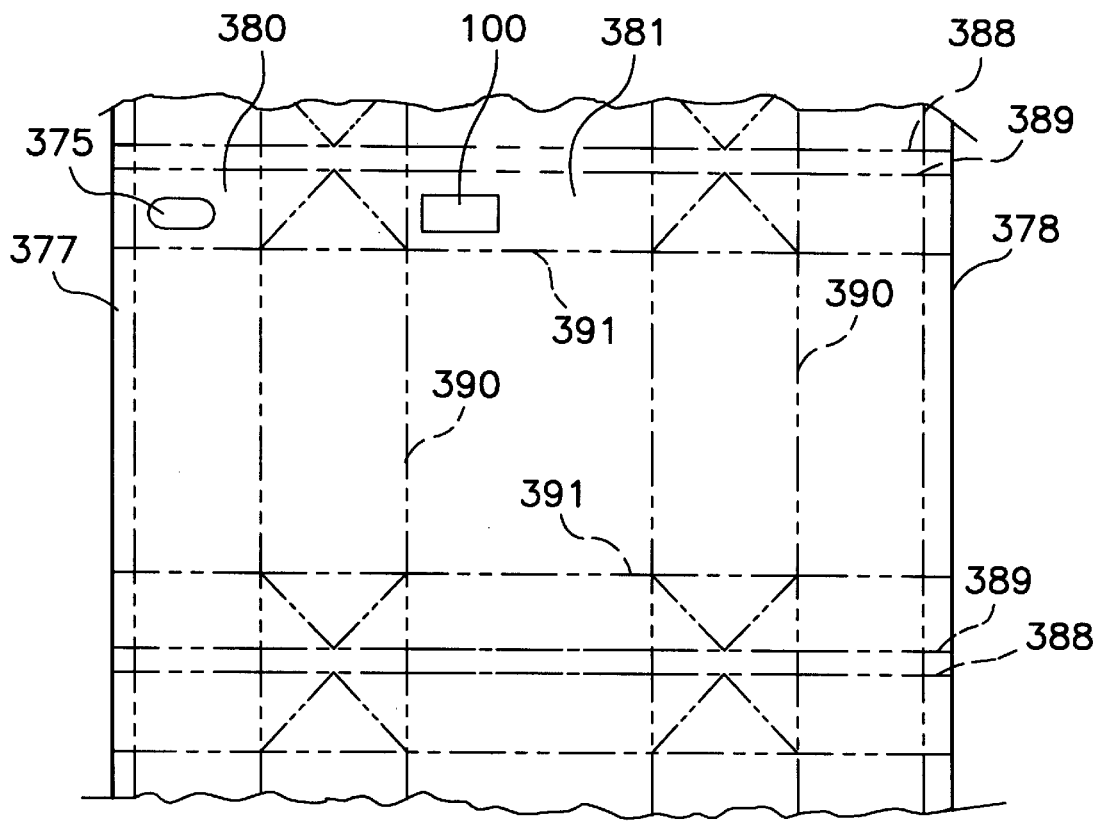
Figure 12:
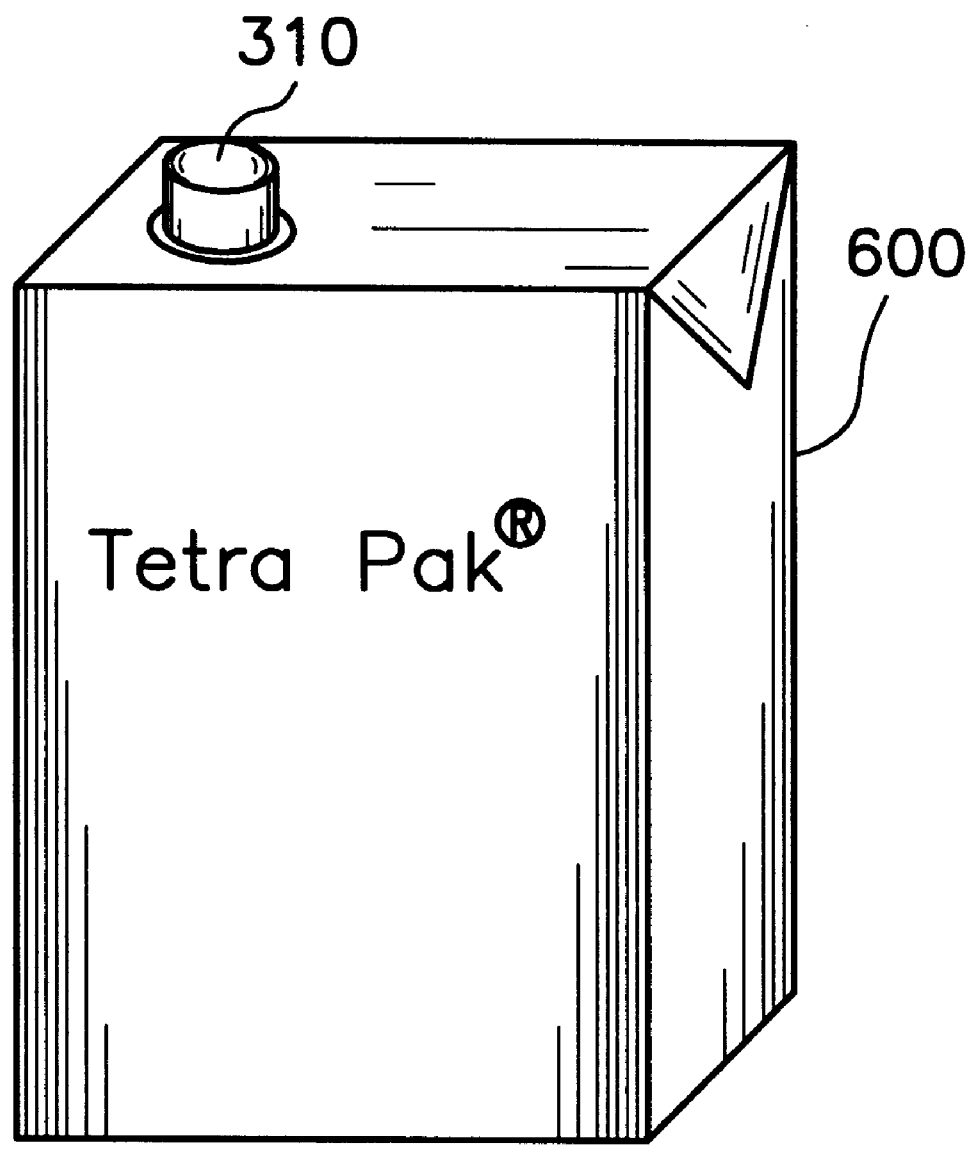

There is illustrated in FIG. 11 a perspective view of another embodiment of the present invention where the packaging material is a roll and the applicator is integrated on a vertical form, fill and seal machine;

There is illustrated in FIG. 11A an enlargement of circle A of FIG. 11 showing the interior surface of the roll of packaging material as the packaging material enters the packaging machine;

There is illustrated in FIG. 12 a top perspective view of a package formed from the vertical form, fill and seal machine.

DETAILED DESCRIPTION OF THE INVENTION

FIGS. 1–4 illustrate four carton blanks 20 that have different embodiments of the means or abhesion of the present invention thereon. The carton blanks 20 are the same except for the embodiments of the present invention. As shown in FIGS. 1–4, a carton blank 20 has a plurality of side panels 21–24 and a side sealing panel 25. Each side panel 21–25 has a corresponding top panel 31–35 and a plurality of bottom panels 41–45. The side panels 21–25, top panels 31–35 and the bottom panels 41–45 are partitioned by a plurality of vertical score lines 50–53. The top panels 31–35 are partitioned from the side panels 21–25 by a top horizontal score line 55. The bottom panels 41–45 are partitioned from the side panels 21–25 by a bottom horizontal score line 56. A plurality of upper fin panels 61–67 are divided from the plurality of top panels 31–35 by an upper horizontal score line 57. A sixth panel 70 is projecting from bottom panel 43. On panel 33 is a perforation, hole or other indication of the positioning of a closure is designated access area 75. Access area 75 is where the closure will be placed on the carton blank. As used herein, closure shall have the same effect as fitment, or any other term used to define a spout and cap arrangement.

Figure 1:
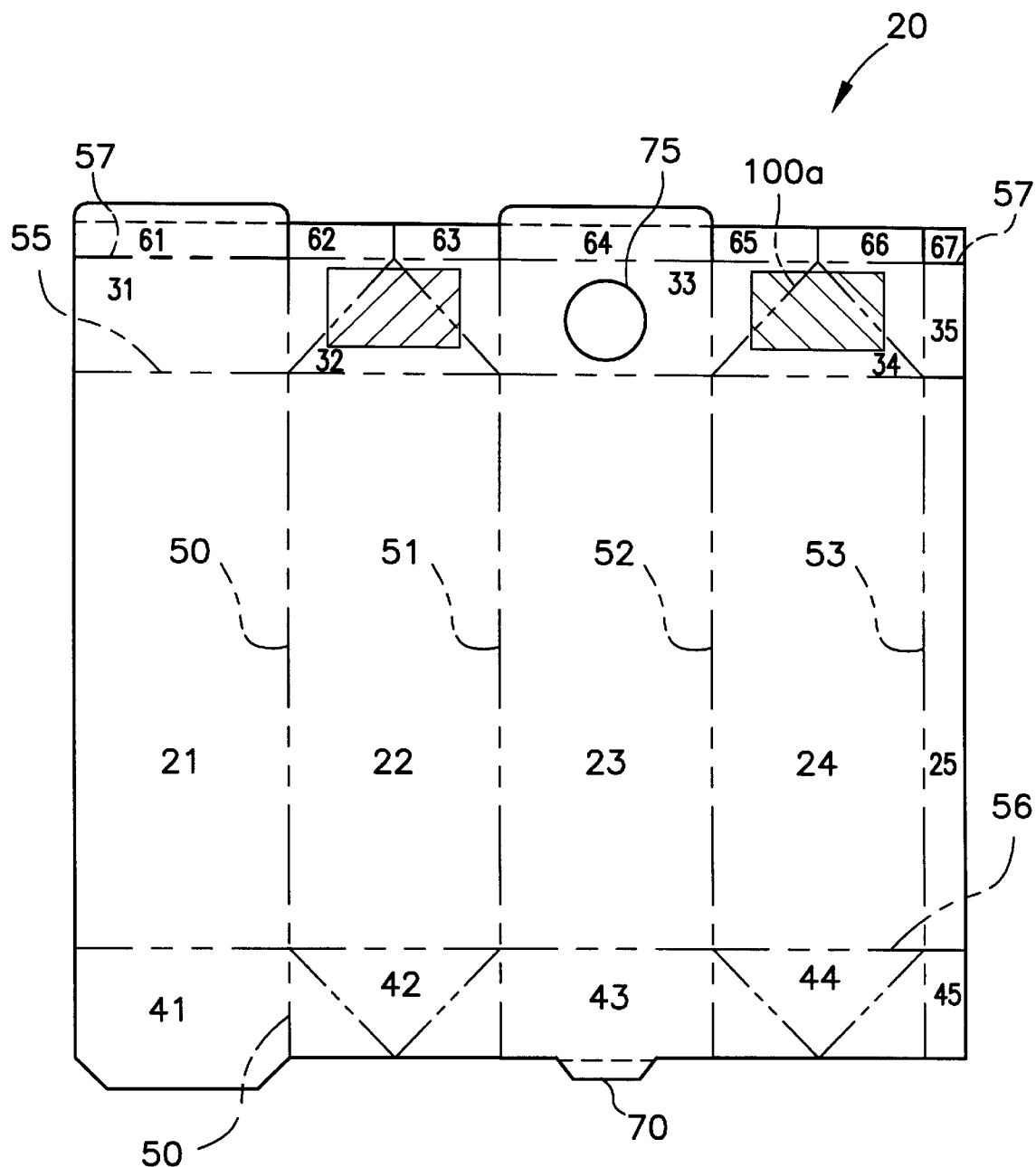

Abhesion as used herein is defined as the opposite of adhesion such that abhesion prevents the adhering of two surfaces. The means for abhesion may take various forms as illustrated in FIGS. 1–4. In FIG. 1, the abhesion means 100a is a coating of an abhesive placed on the carton blank 20. The coating 100a may be directly placed on the blank 20 or may take the form of strip that is placed on the surface of the blank 20. The strip has two surfaces, one that has the coating 100athereon, and the other that mates with the surface of the blank 20. As shown in FIG. 2, the means for abhesion 100b may be a printing on the carton blank 20. In this embodiment, an abhesive material is printed on the carton blank 20 along with any marketing printing.

The abhesive coating, subsequent to drying, in each embodiment may consist essentially of a material selected from copolymers of two ethylenically unsaturated monomers, in particular ethylene and at least one other chain component selected from the group consisting of acrylic acid moieties, vinyl alcohol moieties, and combinations thereof. When applied wet, the abhesive coating may consists of a copolymer, ammonia, water and other releasing additives. The abhesive coating layer, for example, may consist essentially of a copolymer of ethylene and acrylic acid subsequent to drying. One contemplated copolymer is from about 5 mol % to about 50 mol %, alternately from about 15 mol % to about 25 mol %, alternately about 20 mol %, acrylic acid moieties and from about 50 mol % to about 95 mol %, alternately from about 75 mol % to about 85 mol %, alternately about 80 mol % ethylene moieties. The preferred abhesives are branched polymeric chains having a melt index of from about 300 to about 3000, which is an indirect measure of their molecular weights. A melt index of about 300 for a 20% acrylic acid copolymer corresponds to a weight average molecular weight of 18,000 and a number average molecular weight of 7000.

Such abhesives are marketed commercially under the registered trademark PRIMACOR by The Dow Chemical Company, Midland, Mich. A specific material in this family which has been found to be useful is PRIMACOR 5990.

Another type of abhesive useful herein is a copolymer of ethylene and vinyl alcohol having similar molar ratios of its constituents and other properties as the ethylene and acrylic acid copolymers identified above. Terpolymers of ethylene, acrylic acid, and vinyl alcohol, in which the proportions of ethylene moieties are as previously stated and the proportions of the acrylic acid and vinyl alcohol moieties, combined, are the same as those of the acrylic acid moieties of the ethylene/acrylic acid copolymers discussed above, are also contemplated for use as the present abhesives.

The abhesives contemplated herein can be formulated with a variety of other materials, within the scope of the present invention. Fillers such as unmodified or amine modified clay, barium sulfate, barytes, carbon black, titanium dioxide, whiting, calcium carbonate, zinc oxide, colloidal silica, or combinations of these materials can be used. Colors, particularly inorganic pigments and organic pigments, can be used. Invisible dyes which can be detected under ultraviolet light can be used to verify the abhesive application areas. Releasing agent additives may also be employed to further enhance the openability of the carton.

Gums and thickeners can be incorporated in the present abhesives. Exemplary materials of this kind include ACRYSOL ASE (sold by Union Carbide), casein, hydroxyethylcellulose, guar gum, Karaya gum, methylcellulose, polyvinyl alcohol, starches, and the like.

Defoamers and lubricants can be used in these abhesive compositions. Exemplary materials of these kinds are colloidal silica, dioctyl phthalate, paraffin or other waxes (directly or as emulsions), ethylene glycol, propylene glycol, trioctyl phosphate, and 2-ethylhexanol.

Other materials which can be added include inorganic or organic alkalis for pH adjustment, melamine-formaldehyde resin, monovalent electrolytes, a styrene maleic half ester, and the sodium salt of styrene maleic acid.

The present abhesives may be dispersed in water to provide, for example, from about 10% to about 70% solids, optionally from about 14% to about 40% solids, in an aqueous solution. The dispersion may be prepared by heating the neat abhesive above its melting point and mixing or emulsifying it with water in the presence of an alkaline agent. If a fugitive alkali is desired, ammonia can be used. An organic or inorganic alkali can also be used, although if a substantial amount of non-volatile alkali remains in the final coating its resistance to penetration by water might be reduced. Other diluents useful herein include water-miscible and water-soluble solvents, for example alcohols, particularly isopropanol. Other organic solvents can be used, but are less preferred in an industrial setting than water or water-soluble materials.

The water dispersion can have the following exemplary properties at a standard temperature, such as 77° F. (25° C.): a solids level of from about 10% to about 50% by weight, a viscosity by Brookfield LVT of from less than about 60 cps (#1 spindle at 60 RPM) to at least 600 cps (#3 spindle at 60 RPM), a Zahn Cup viscosity of from less than 25 seconds (#2 cup) to more than 40 sec (#3 cup); and a pH of from about 7.5 or a little less to about 11.5 or more.

Specific abhesive formulations which are useful herein are sold by Michelman Inc., Cincinnati, Ohio, Mica Corporation, Stratford, Conn., Pierce & Stevens, Varitech Division and Findley Abhesives Inc., Wauwatosa, Wis.

The aqueous abhesive formulation is applied in a very thin layer, for example, less than a mil (0.025 mm. or 25μ) thick, potentially less than 0.1μ thick, on heat-sealable gable-top container stock. Rotogravure, flexographic, or pad application equipment can be used for this purpose. The solvent is allowed to evaporate, which may be accomplished more quickly by heating the abhesive areas, to provide a dry coating. The abhesive may be applied before or after blanks are formed from the stock. The blanks are then used conventionally to make, fill, and seal containers.

Returning to FIG. 3, a third type of means for abhesion 100c is an embossment on the carton blank 20. The embossment 100c has depressions 101 and elevations 102. The depressions 101 and elevations 102 on the carton blank 20 present a non-flat surface for mating with access area 75. During application of a closure, adhesion between the access area 75 and the embossment 100c is inhibited by the non-flat surface of the embossment 100c. The embossment 100c may take the form of sharp elevations 102 and depressions 101, or curved elevations 102 and depressions 101. The elevations 102 and depressions 101 reduce the amount of contact surface between the access area 75 and the embossment 100c thereby reducing adhesion between the access area 75 and the embossment 100c.

Another embodiment of the carton blank of the present invention is shown in FIG. 4. In this embodiment, the abhesion means 100d is placed on the interior surface of the access area 75. In such an embodiment, to access the finished carton the perforation 75 may be incised by a cutting device on the closure. Also, the access area 75 may be hole and the abhesion means 100d acts as a membrane that is removed by the final consumer to access the contents of the finished carton. The abhesion means 100d may be any of the previously mentioned abhesion means 100a–c. For example, the carton blank 20 may be embossed to create embossment 100c and also partially cut to create a perforation for the access area 75. Another example is abhesion means 100a where the coating is a strip having the non-adhesive coating surface as a membrane and access area 75 as a hole.

As shown in FIGS. 5 and 5A, once the carton blank 20 is folded and longitudinally sealed the top panel 31 lies over the top panel 32. The longitudinal seal is formed by sealing the sealing side panels 25, 35 and 45 to respective panels 21, 31 and 41. A carton blank 20 is usually delivered to a dairy, or other packaging facility, in this folded and longitudinally sealed form. The closure may be applied to the carton blank 20 at the dairy, prior to insertion on a packaging machine. Alternatively, the closure may be applied to the carton blank 20 at a converting plant and delivered to a dairy with the closure thereon, and ready for processing on the packaging machine.

As shown in FIG. 5A, the abhesion means 100 lies opposite the surface of the access area 75. Thus during application of the closure, panel 33 will not adhere to panel 34. If the abhesion means 100 was absent, a polyethylene coated blank would have panel 33 adhere to panel 34 after application of a closure to access area 75. The embodiment of FIG. 4 would have the abhesion means on the interior surface of panel 33 instead of on the interior surface of panel 34 to prevent adhesion between panels 33 and panels 34.

As shown in FIG. 6, an apparatus for applying closures is generally designated 200. The apparatus 200 includes a conveyor mechanism 202, an anvil 204, closure attachment means 206 and a closure dispenser 208. A plurality of closures 210 are supplied from a bowl 212 to a chute 214 for positioning at an attachment site 216. A closure dispenser and attachment means are disclosed in co-pending U.S. patent application 08/996,606, filed on Dec. 23, 1997 for an Orienting Apparatus For An Orientationally Sensitive Closure, having the same assignee as the present invention and which is hereby incorporated by reference. As a blank 20 is conveyed to the site 216, a closure 210 is readied for attachment to the blank 20. The access area 75 is placed over the anvil 204 and under a closure 210. The attachment means 206 then attached the closure 210 to the blank 20 at the access area 75. The attachment means 206 may be an ultrasonic horn having a convertor and sonotrode to utilize ultrasonic energy to attach the closure to the blank 20. Alternatively, the attachment means may be a heating device that heats the closure and access area 75 to create a chemical adhesion between access area 75 and the closure 210. Yet another embodiment would have a hot melt applied to the closure and the attachment means acting as a pressure tube to attach the closure 210 to the blank 20. The conveyor may have guides 220 to transfer the blank 20 to the site 216.

As shown in FIG. 7, the blank 20 is positioned for attachment of a closure 210. As shown in FIG. 8, the closure 210 is attached to the carton blank 20 by the attachment means 206. The attachment means 206 presses the closure 210 against the blank 20 which is pressed against the anvil 204. As shown in FIG. 9, the blank 20 with a closure 210 attached is conveyed away from the attachment point 216 and a new carton blank 20a is conveyed to the attachment point 216.

The apparatus 200 may be a stand-alone machine, or it may be integrated into a packaging machine either before or immediately after the magazine for the packaging machine. The carton blank may then be transported to the carton opening device of the packaging machine for processing into a finished carton as shown in FIG. 10.

An alternative embodiment of the packaging material of present invention is shown in FIG. 11 and 11A. In this embodiment, the packaging material is a roll of packaging material 300 instead of the carton blank 20. The abhesion means 100 may be the same as for the carton blank 20. Thus, a coating, printing, strip or embossment may be utilized as the abhesion means for the roll of packaging material 300. Similar to the carton blank 20 of FIG. 4, the abhesion means 100 may be placed over the access area 375 of the roll of packaging material 300.

As shown in FIG. 11A, a sealing panel 377 is longitudinally sealed to a second sealing panel 378 to form the packaging material 300 into a tube as described below. During compression of the tube to attach the closure 310, panel 380 will overlie panel 381. This will allow for application of the closure 310 without sealing of the surfaces of the tube together. The roll of packaging material 300 is partitioned into individual package parameters by a plurality of score lines 388 and 389. The area between horizontal score line 388 and 389 is where the traversal cut will be made to create an individual package from the tube of material 300. A plurality of vertical score lines 390 and a plurality of horizontal score lines 391 define the panels of each individual package.

The roll of packaging material 300 is fabricated into a tube through longitudinal sealing on a vertical form, fill and seal machine 400 such as a TETRA BRIK® packaging machine available from Tetra Pak, Incorporated of Chicago, Ill. The closure application apparatus 500 is placed after the longitudinal sealer 440 which forms the tube of packaging material, however before the traversal sealer 445. The applicator apparatus 500 has an anvil 501 on one side of the packaging material tube 300 and an attachment means 502 on the other side of the tube 300. The closures 310 are supplied from a source 503 via a chute 504 to the attachment means 502. A preferred attachment means is an ultrasonic sealer. The applicator apparatus 500 presses the tube together to apply the closure to the tube of packaging material prior to traversal sealing of the tube of packaging material 300. It should be noted that the tube may already be filling with a product from a fill pipe 465 during the application of the closure 410 to the tube of packaging material 300.

As shown in FIG. 12, the finished package 600 is the ubiquitous TETRA BRIK® package having a closure 310 thereon. The present invention allows for aseptic application of the closure without exposing the closure 310 to a hydrogen peroxide bath or through the various winding rollers. This particular closure will cut a membrane of the TETRA BRIK® package allowing for access to the product.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims:

I claim as my invention:

1. A packaging material for fabrication into a package with a closure thereon, the packaging material having an exterior surface and an interior surface, the packaging material comprising:

a plurality of score lines defining a plurality of panels on the packaging material at least some of the score lines defining a plurality of top fin panels configured to be sealed to one another when the package is fabricated;

an access area on at least one of the plurality of panels spaced from the plurality of top fin panels configured to be sealed to one another, the access area defining the placement of the closure on the exterior surface of the packaging material; and means for abhering the packaging material to itself during application of a closure, the abhering means disposed on another of the plurality of panels different than the panel on which the access area is disposed, the abhering means being disposed for contact with the interior surface of the access area, spaced from the plurality of top fin panels configured to be sealed to one another when the package is fabricated, during application of the closure.

2. The packaging material of claim 1 wherein the packaging material is a carton blank.

3. The packaging material of claim 2 wherein the abhering means is a coating of an abhesive material.

4. The packaging material of claim 2 wherein the abhering means is a printing of an abhesive material.

5. The packaging material of claim 2 wherein the abhering means is a strip having an abhesive material on one side of the strip.

6. The packaging material of claim 2 wherein the abhering means is an embossment on the packaging material.

7. The packaging material of claim 1 wherein the abhering means comprises:

copolymers of two ethylenically unsaturated monomers; and at least one other chain component selected from the group consisting of acrylic acid moieties, vinyl alcohol moieties, and combinations thereof.

8. The packaging material of claim 1 wherein the packaging material is a roll of packaging material.

9. The packaging material of claim 8 wherein the abhering means is a coating of an abhesive material.

10. The packaging material of claim 8 wherein the abhering means is a printing of an abhesive material.

11. The packaging material of claim 8 wherein the abhering means is a strip having an abhesive material on one side of the strip.

12. The packaging material of claim 8 wherein the abhering means is an embossment on the packaging material.

* * * * *